(12) United States Patent
Li et al.

(10) Patent No.: US 10,018,773 B2
(45) Date of Patent: Jul. 10, 2018

(54) BACKLIGHT MODULE AND DISPLAY DEVICE

(71) Applicants: BOE Technology Group Co., Ltd., Beijing (CN); Hefei Xinsheng Optoelectronics Technology Co., Ltd., Anhui (CN)

(72) Inventors: Yanping Li, Beijing (CN); Zhiyu Qian, Beijing (CN); Zhengyuan Zhang, Beijing (CN); Yiqiang Jiang, Beijing (CN); Yong Sun, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 15/121,405

(22) PCT Filed: May 29, 2015

(86) PCT No.: PCT/CN2015/080271
§ 371 (c)(1),
(2) Date: Aug. 25, 2016

(87) PCT Pub. No.: WO2016/101530
PCT Pub. Date: Jun. 30, 2016

(65) Prior Publication Data
US 2016/0363720 A1 Dec. 15, 2016

(30) Foreign Application Priority Data
Dec. 24, 2014 (CN) .......................... 2014 1 0820310

(51) Int. Cl.
*F21V 7/04* (2006.01)
*F21V 8/00* (2006.01)
*G02F 1/1335* (2006.01)

(52) U.S. Cl.
CPC ..... *G02B 6/0088* (2013.01); *G02F 1/133608* (2013.01)

(58) Field of Classification Search
USPC ........................................ 362/633
See application file for complete search history.

(56) References Cited

U.S. PATENT DOCUMENTS 9,207,478 B2 12/2015 Wang et al.
2002/0191131 A1* 12/2002 Ota ................... G02F 1/133514
349/108
2008/0101074 A1* 5/2008 Ogura ................ F21V 19/0095
362/382

FOREIGN PATENT DOCUMENTS

CN 201159809 Y 12/2008
CN 101751834 A 6/2010
(Continued)

OTHER PUBLICATIONS

Second Office Action, including Search Report, for Chinese Patent Application No. 201410820310.8, dated Nov. 3, 2016, 14 pages.
(Continued)

*Primary Examiner* — Matthew Mikels
(74) *Attorney, Agent, or Firm* — Westman, Champlin & Koehler, P.A.

(57) ABSTRACT

A backlight module includes: a first frame having a first portion parallel to the display substrate; and a first light shielding structure provided between the first portion and the display substrate, wherein a vertical projection of the first light shielding structure on a plane in which the display substrate is located at least partially overlaps with at least one substrate light shielding structure adjacent to an edge of (Continued)

the display substrate. An embodiment of the present invention further provides a display device including the backlight module described above.

19 Claims, 1 Drawing Sheet

(56)  References Cited

FOREIGN PATENT DOCUMENTS

| | | |
|---|---|---|
| CN | 103048827 A | 4/2013 |
| CN | 103697416 | 4/2014 |
| CN | 203549696 | 4/2014 |
| CN | 203718519 U | 7/2014 |
| CN | 203868825 | 10/2014 |
| CN | 104166271 A | 11/2014 |
| CN | 104456327 A | 3/2015 |
| CN | 204268258 U | 4/2015 |
| JP | 2013-68869 A | 4/2013 |
| TW | 200602766 A | 1/2006 |

OTHER PUBLICATIONS

International Search Report and Written Opinion, including English translation of Box No. V, for International Application No. PCT/CN2015/080271, dated Sep. 21, 2015, 12 pages.
Office Action, including Search Report, for Chinese Patent Application No. 201410820310.8, dated May 26, 2016, 12 pages.
Third Office Action, including Search Report, for Chinese Patent Application No. 201410820310.8, dated May 15, 2017, 14 Pages.

* cited by examiner

BACKLIGHT MODULE AND DISPLAY DEVICE

CROSS-REFERENCE TO RELATED APPLICATIONS

This application is a Section 371 National Stage Application of International Application No. PCT/CN2015/080271, filed on 29 May 2015 and entitled with "Backlight Module and Display Device", which claims priority to Chinese Application No. 201410820310.8, filed on 24 Dec. 2014 and entitled with "A Backlight Module and Display Device", which are incorporated herein by reference in their entirety.

BACKGROUND OF THE INVENTION

Field of the Invention

The present disclosure relates to a field of display technology, and particularly to a backlight module and a display device.

Description of the Related Art

FIG. 1 shows a display device in prior art. The display device includes a backlight module 1', a color filter substrate 2' and an array substrate 3'. In particular, a black matrix 21' is provided within a non-display area of the color filter substrate 2'; a binding area 31' is provided within a non-display area of the array substrate 3', the binding area 31' being covered with a UV-curable adhesive 32' to protect binding wires in the binding area 31'. The backlight module 1' includes an adhesive frame 11' for supporting the color filter substrate 2' and the array substrate 3'. The adhesive frame 11' includes a first portion 111' parallel to the array substrate 3'. A rubber strip 12' is provided between the first portion 111' and the non-display area of the array substrate 3'.

SUMMARY OF THE INVENTION

According to an embodiment of one aspect of the present disclosure, there is provided a backlight module for a display substrate, including:

a first frame having a first portion parallel to the display substrate; and a first light shielding structure provided between the first portion and the display substrate, wherein a vertical projection of the first light shielding structure on a plane in which the display substrate is located at least partially overlaps with at least one substrate light shielding structure adjacent to an edge of the display substrate.

BRIEF DESCRIPTION OF THE DRAWINGS

In order to illustrate technical solutions according to the embodiments of the present invention or technical solutions in the prior art more clearly, the drawings that will be used in describing the embodiments of the present invention or technical solutions in the prior art will be briefly described. It is apparent that the drawings in the following description are only some embodiments according to the present disclosure and other drawing can also be obtained by a person with an ordinary skill in the art on the basis of these drawings without creative efforts.

Figure 1:
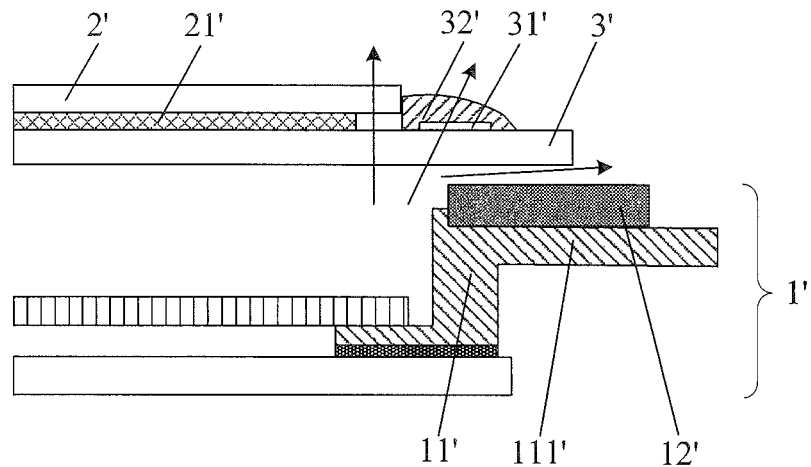
FIG. 1 is a schematic diagram of a peripheral light leakage phenomenon in the display device in the prior art.

| Reference Numerals: | | |
|---|---|---|
| 1- backlight module; | 11- first frame; | 111- first portion; |
| 111a- attaching reference; | 112- second portion; | 12- first light shielding structure; |
| 13- light guide plate; | 14- optical film; | 15- rubber strip; |
| 2- display substrate; | 21- substrate light shielding structure; | |
| 3- array substrate; | 31- binding area; | 32- second light shielding structure; |
| 4 - flexible circuit board. | | |

DETAILED DESCRIPTION OF EMBODIMENTS OF THE INVENTION

The technical solutions according to embodiments of the present invention will now be described clearly and completely in connection with the accompanying drawings in embodiments of the present invention. It is apparent that the described embodiments are merely part of the embodiments of the present invention, but not all embodiments. All other embodiments that can be obtained by those with ordinary skills in the art based on the embodiments of the present invention without creative efforts fall within the protection scope of the present invention.

The inventor has found that for the display device having the above structure a peripheral light leakage phenomenon occurs in the display process. Specifically, the reasons for the peripheral light leakage mainly relates to three following aspects: 1) the black matrix 21' does not extend to the edge of the color filter substrate 2' and the lights pass through the area of the color filter substrate 2' that is not covered by the black matrix; 2) the UV-curable adhesive 32' is usually white or blue and thus transparent more or less, so that the lights can pass through this area; and 3) due to the production process, surface of the first portion 111' of the adhesive frame 11' next to the array substrate 3' is uneven such that there is a gap between the rubber strip 12' and the array substrate 3', and the gap makes it possible for the lights to pass through.

Embodiments of the present invention provide a backlight and a display device which are capable of suppressing the peripheral light leakage phenomenon in the display device.

According to an embodiment of one aspect of the present disclosure, there is provided a backlight module for a display substrate, including:

a first frame having a first portion parallel to the display substrate; and a first light shielding structure provided between the first portion and the display substrate, wherein a vertical projection of the first light shielding structure on a plane in which the display substrate is located at least partially overlaps with at least one substrate light shielding structure adjacent to an edge of the display substrate.

In a backlight module according to an embodiment of the present invention, a material for forming the first light shielding structure includes rubber.

In a backlight module according to an embodiment of the present invention, the substrate light shielding structure includes a black matrix on the display substrate.

In a backlight module according to an embodiment of the present invention, a width of the overlapped area is greater than or equal to 1 mm.

In a backlight module according to an embodiment of the present invention, an edge of the first light shielding structure on its side away from center of the backlight module is aligned with an edge of the display substrate or extends beyond the edge of the display substrate.

In a backlight module according to an embodiment of the present invention, the first frame is an adhesive frame; an attaching reference is disposed on a side of the first portion adjacent to the display substrate; and the first light shielding structure extends from the attaching reference in a direction toward vicinity of the center of the backlight module.

In a backlight module according to an embodiment of the present invention, the attaching reference is a strip-like protrusion.

In a backlight module according to an embodiment of the present invention, the backlight module further includes a light guide plate, and the first frame further includes a second portion that vertically extends from an end of the first portion in a direction toward vicinity of the light guide plate and that is connected to the light guide plate by a connecting structure.

In a backlight module according to an embodiment of the present invention, the vertical projection of the first light shielding structure on the plane in which the substrate light shielding structure is located at least partially overlaps with the substrate light shielding structure adjacent to the edge of the display substrate, such that the first light shielding structure can shield an area adjacent to the edge of the display substrate that is not covered by the substrate light shielding structure, and such that length of the gap between the first light shielding structure and the display substrate increases, thereby suppressing the peripheral light leakage phenomenon in the display device.

According to an embodiment of another aspect of the present disclosure, there is provided a display device including a display substrate and a backlight module according to any of the embodiments described above.

The display device according to an embodiment of the present invention further includes an array substrate provided opposite to the display substrate, wherein a peripheral area of the array substrate is provided with a binding area that is covered with a second light shielding structure.

In a display device according to an embodiment of the invention, the second light shielding structure includes a black UV-curable adhesive.

In a display device according to an embodiment of the invention, the second light shielding structure adjoins an edge of the display substrate.

The display device according to the embodiment of the present invention further includes a flexible circuit board that is electrically connected to the binding wires in the binding area, the second light shielding structure covering an edge of the flexible circuit board.

In a display device according to an embodiment of the invention, a width of the second light shielding structure is 1.0 mm-1.5 mm.

In a display device according to an embodiment of the invention, the at least one substrate light shielding structure extends to the edge of the display substrate.

The embodiment of the present invention provides a display device described above. Since the display device employs a backlight module according to the embodiments described above, in this display device, a vertical projection of the first light shielding structure on the plane in which the substrate light shielding structure is located at least partially overlaps with the substrate light shielding structure adjacent to the edge of the display substrate, such that the first light shielding structure can shield an area adjacent to the edge of the display substrate that is not covered by the substrate light shielding structure, and such that length of the gap between the first light shielding structure and the display substrate increases, thereby suppressing the peripheral light leakage phenomenon in the display device.

Figure 2:
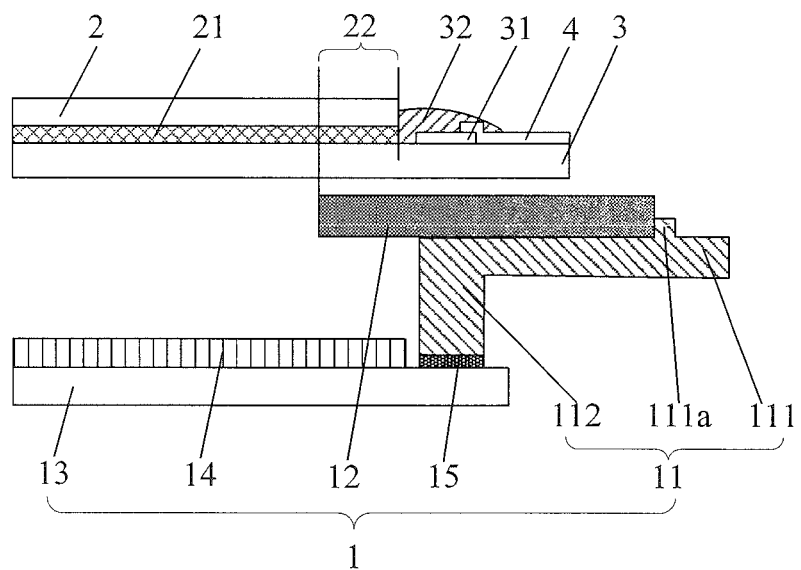
FIG. 2 is a partial cross-sectional schematic view of a display device according to an embodiment of the invention.

As shown in FIG. 2, an embodiment of the present invention provides a backlight module 1 for a display substrate 2, including: a first frame 11 for fixing an optical film 14, the first frame 11 having a first portion 111 parallel to the display substrate 2; and a first light shielding structure 12 provided between the first portion 111 and the display substrate 2, wherein a plurality of substrate light shielding structures 21 are within a non-display area of the display substrate 2 and a vertical projection of the first light shielding structure 12 on the plane in which the display substrate 2 is located at least partially overlaps with at least one substrate light shielding structure of the plurality of substrate light shielding structures 21 that adjoins an edge of the display substrate.

It should be noted that, in the backlight module according to the various embodiments of the present invention, although the concepts of display substrate, array substrate or color filter substrate, etc., are mentioned herein, it does not mean that the backlight module includes these devices or structures, but mean that the backlight module is necessary to be matched to a display substrate, an array substrate or a color filter substrate etc., when used.

In addition, in the following detailed description, for purpose of explanation, many specific details are described so as to provide a thorough understanding on the disclosed embodiments. Obviously, however, one or more embodiments may also be implemented without these specific details. In other instances, well-known structures and devices are illustrated in a schematic manner in order to simplify the drawings.

An embodiment of the present invention provides a backlight module described above. In the above-described backlight module, the vertical projection of the first light shielding structure on the plane in which the display substrate is located overlaps with the substrate light shielding structures adjacent to an edge of the display substrate, such that the first light shielding structure can shield an area adjacent to the edge of the display substrate that is not covered by the substrate light shielding structures, and such that length of the gap between the first light shielding structure and the display substrate increases, thereby suppressing the peripheral light leakage phenomenon in the display device.

In particular, the first light shielding structure 12 in an embodiment of the present invention is elastic, and for example, material of the first light shielding structure 12 includes rubber, so that while the first light shielding structure 12 shields the lights, the first light shielding structure 12 can also be used as a damping pad between the first frame 11 and the display substrate 2. Further, when an edge of the first light shielding structure 12 on its side adjacent to a center of the backlight module 1 extends beyond an edge of the first portion 111 on its side adjacent to the center of the backlight module 1, the first light shielding structure 12 made of rubber material is stiff so as not to tend to bend or sag, thereby preventing a portion of the first light shielding structure 12 that extends beyond the first portion 111 from bending or sagging, and thus suppress a phenomenon that the gap between the first light shielding structure 12 and the display substrate 2 increases.

In one embodiment, the substrate light shielding structure 21 includes a black matrix on the display substrate 2. As an example, when the display substrate 2 is a color filter substrate, sub-pixels and a black matrix are provided on the color filter substrate. The black matrix is disposed in the gaps between the adjacent sub-pixels on the display substrate 2 and corresponds to the position of the gate lines, data lines, and thin film transistors in the array substrate to shield the gate lines, data lines and thin film transistors.

In order to improve the effect of preventing light leakage, a width of the overlapped area 22 between the vertical projection of the first light shielding structure 12 on a plane in which the display substrate 2 is located and the substrate light shielding structure 21 is greater than or equal to 1 mm.

Further, an edge of the first light shielding structure 12 on its side away from the center of the backlight module 1 is aligned with an edge of the display substrate 2 or extends beyond the edge of the display substrate 2, which may result in that length of the gap between the first light shielding structure and the display substrate 2 increases, thereby further suppressing the peripheral light leakage phenomenon in the display device. It should be noted that, the edge of the first light shielding structure 12 on its side away from the center of the backlight module 1 extending beyond the edge of the display substrate 2 particularly means that the edge of the first light shielding structure 12 on its side away from the center of the backlight module 1 extending beyond the edge of the display substrate 2 in a direction away from the center of a backlight module 1.

In an embodiment of the present invention, the first frame 11 is an adhesive frame. Then, the first light shielding structure 12 is secured to the first portion 111 by an attaching manner. Therefore, in order to reduce the attaching difficulty of the first light shielding structure 12 and to ensure a precise attaching position, an attaching reference 111a can be disposed on a surface of the first portion 111 adjacent to the display substrate 2, and the first light shielding structure 12 is attached based on the attaching reference 111a. The first light shielding structure 12 extends from the attaching reference 111a in a direction toward vicinity of the center of the backlight module 1.

In one embodiment, the attaching reference 111a is a strip-like protrusion integrally formed on the first portion 111. The strip-like protrusion is not only used as an attaching reference of the first light shielding structure 12, bust also may prevent the first light shielding structure 12 from moving in a direction away from the center of the backlight module 1.

In one embodiment, referring to FIG. 1, the first frame 11 includes: a first portion, a second portion that vertically extends from an end of the first portion in a direction toward vicinity of the light guide plate, and a third portion extending to a space between the light guide plate and the optical film from the second portion. Providing the third portion can shield a part of the lights that are emitted toward an area of the display substrate that is not covered by the substrate light shielding structure. A rubber strip for preventing the movement of the light guide plate may be provided between the third portion and the light guide plate.

In one alternative embodiment of the present invention, since the first light shielding structure 12 can shield the area of the display substrate 2 that is not covered by the substrate light shielding structure 21, the first frame 11 may not include the third portion. As shown in FIG. 2, the first frame 11 includes a first portion 111, a second portion 112 that vertically extends from an end of the first portion 111 in a direction toward vicinity of the light guide plate 13 in the backlight module 1. The second portion 112 is connected to the light guide plate 13 by a connecting structure 15. The connecting structure 15 may be a rubber strip. Since the first frame 11 does not include the third portion between the light guide plate 13 and the optical film 14, the structure of the first frame 11 is simple and the mounting of the first frame 11 is also simplified.

According to an embodiment of another aspect of the present disclosure, there is provided a display device, as shown in FIG. 2, which includes a display substrate 2 and a backlight module 1 according to any of the embodiments described above.

With the display device according to the embodiment of the present invention, since a backlight module described above is employed, in this display device, a vertical projection of the first light shielding structure on the plane in which the substrate light shielding structure is located at least partially overlaps with the substrate light shielding structure adjacent to the edge of the display substrate, such that the first light shielding structure can shield an area adjacent to the edge of the display substrate that is not covered by the substrate light shielding structure, and such that length of the gap between the first light shielding structure and the display substrate increases, thereby suppressing the peripheral light leakage phenomenon in the display device.

In particular, the display device described above further includes an array substrate 3 provided opposite to the display substrate 2, wherein a peripheral area of the array substrate 3 is provided with a binding area 31 that is covered with a second light shielding structure 32, thereby further preventing lights from passing through the binding area 31 of the array substrate 3.

In one embodiment, the second light shielding structure 32 includes a black UV-curable adhesive such that the second light shielding structure 32 does not only shield the lights but also protects the binding wires in the binding area 31. It should be noted that, although the black UV-curable adhesive has excellent light shielding effect, the curing time thereof is correspondingly long due to its light shielding property, which result in a long assembly time of the display device. The curing time of the black UV-curable adhesive may be shortened by increasing the illumination intensity of UV light or changing the curing mechanism so that the assembly time of the display device may be shortened.

In an embodiment of the present invention, the second light shielding structure 32 adjoins the edge of the display substrate 2. The second light shielding structure 32 can be formed by coating a viscous raw material, such as black UV-curable adhesive, along the edge of the display substrate 2. Since the black UV-curable adhesive has a certain degree of flowing property, it is possible for the black UV-curable adhesive to flow in a direction away from the edge of the display substrate 2. In the case that the display device further includes a flexible circuit board 4 disposed on the array substrate 3 and electrically connected to the binding wires in the binding area 31, the black UV-curable adhesive can flow toward the edge of the flexible circuit board 4. The resulting second light shielding structure 32 may cover the edge of the flexible circuit board 4, thereby further suppressing the peripheral light leakage phenomenon. Further, the width of the second light shielding structure 32 in the embodiment of the present invention is 1.0 mm-1.5 mm so as to ensure that it can cover the edge of the flexible circuit board 4.

To further prevent the lights from passing through the non-display area adjacent to the edge of the display substrate 2, at least one substrate light shielding structure 21 that is located at the edge of the display substrate 2 extends to the edge of the display substrate 2. The at least one substrate light shielding structure 21 at least partially overlaps with the first light shielding structure 12 such that they cooperate with each other together, thereby improving the effect of preventing light leakage. In particular, in the cutting process to form the display substrate 2, the cutting may be performed along the edge of some substrate light shielding structures 21, such that the edge of the display substrate 2 is aligned with the edge of the substrate light shielding structures 21, that is, the substrate light shielding structure 21 extends to the edge of the display substrate 2. Debris generated in the above-described cutting process may contaminate a polarizer (not shown) located on a side of the display substrate 2 away from the array substrate 2 such that foreign matters are present on the polarizer. Therefore, in an embodiment of the present invention, a stiff cleaning hair brush or gridding strap is employed to clear up the foreign matters on the polarizer to ensure that the display effect of the display device is not affected.

Further, the display device according to the embodiment of the present invention may be: a liquid crystal panel, an electronic paper, a mobile phone, a tablet computer, a television, a monitor, a notebook computer, a digital picture frame, a navigator, or any other product or component having a display function.

The contents described above are only specific embodiments of the present invention, and the protection scope of the present disclosure is not limited thereto. Any variations of alternations that can be envisaged by those skilled in the art within the technical scope disclosed by this disclosure will fall within the protection scope of the present disclosure. Accordingly, the protection scope of the disclosure should be defined by the appended claims.

What is claimed is:

1. A backlight module for a display substrate, comprising:
   a first frame having a first portion parallel to the display substrate; and
   a first light shielding structure provided between the first portion and the display substrate,
   wherein a vertical projection of the first light shielding structure on a plane in which the display substrate is located at least partially overlaps with at least one substrate light shielding structure adjacent to an edge of the display substrate,
   wherein the first is an adhesive frame;
   wherein an attaching reference is disposed on a side of the first portion adjacent to the display substrate; and
   wherein the first light shielding structure extends from the attaching reference in a direction toward vicinity of the center of the backlight module.

2. The backlight module according to claim 1,
   wherein a material for forming the first light shielding structure comprises rubber.

3. The backlight module according to claim 1,
   wherein the substrate light shielding structure comprises a black matrix on the display substrate.

4. The backlight module according to claim 1,
   wherein a width of the overlapped area is greater than or equal to 1 mm.

5. The backlight module according to claim 1,
   wherein an edge of the first light shielding structure on its side away from center of the backlight module is aligned with an edge of the display substrate or extends beyond the edge of the display substrate.

6. The backlight module according to claim 1,
   wherein the attaching reference is a strip-like protrusion.

7. The backlight module according to claim 1, further comprising:
   a light guide plate,
   wherein the first frame further comprises a second portion that vertically extends from an end of the first portion in a direction toward vicinity of the light guide plate and that is connected to the light guide plate by a connecting structure.

8. A display device, comprising:
   a display substrate; and
   a backlight module according to claim 1.

9. The display device according to claim 8, further comprising:
   an array substrate provided opposite to the display substrate,
   wherein a peripheral area of the array substrate is provided with a binding area that is covered with a second light shielding structure.

10. The display device according to claim 9,
    wherein the second light shielding structure comprises a black UV-curable adhesive.

11. The display device according to claim 10,
    wherein the second light shielding structure adjoins an edge of the display substrate.

12. The display device according to claim 11, further comprising:
    a flexible circuit board that is electrically connected to binding wires in the binding area,
    wherein the second light shielding structure covers an edge of the flexible circuit board.

13. The display device according to claim 12,
    wherein a width of the second light shielding structure is 1.0 mm-1.5 mm.

14. The display device according to claim 8,
    wherein the at least one substrate light shielding structure extends to the edge of the display substrate.

15. The backlight module according to claim 4,
    wherein a material for forming the first light shielding structure comprises rubber.

16. The backlight module according to claim 4,
    wherein the substrate light shielding structure comprises a black matrix on the display substrate.

17. The backlight module according to claim 5,
    wherein a material for forming the first light shielding structure comprises rubber.

18. The backlight module according to claim 5,
    wherein the substrate light shielding structure comprises a black matrix on the display substrate.

19. The backlight module according to claim 5,
    wherein a width of the overlapped area is greater than or equal to 1 mm.

* * * * *